United States Patent
Lundblad et al.

(10) Patent No.: US 11,820,112 B2
(45) Date of Patent: Nov. 21, 2023

(54) METHOD TO PRODUCE A THERMOPLASTIC WEAR RESISTANT FOIL

(71) Applicant: Valinge Innovation AB, Viken (SE)

(72) Inventors: Christer Lundblad, Örkelljunga (SE); Niclas Håkansson, Viken (SE); Göran Ziegler, Viken (SE)

(73) Assignee: VÄLINGE INNOVATION AB, Viken (SE)

( * ) Notice: Subject to any disclaimer, the term of this patent is extended or adjusted under 35 U.S.C. 154(b) by 171 days.

(21) Appl. No.: 16/992,215

(22) Filed: Aug. 13, 2020

(65) Prior Publication Data
US 2021/0053322 A1    Feb. 25, 2021

Related U.S. Application Data

(63) Continuation of application No. 16/113,333, filed on Aug. 27, 2018, now Pat. No. 10,780,676, which is a
(Continued)

(30) Foreign Application Priority Data

Jul. 16, 2014 (SE) .................................... 1450894-9
Jul. 16, 2014 (SE) .................................... 1450895-6
Apr. 16, 2015 (SE) .................................... 1550455-8

(51) Int. Cl.
*B29K 627/06* (2006.01)
*B29K 75/00* (2006.01)
(Continued)

(52) U.S. Cl.
CPC ................ *B32B 27/08* (2013.01); *B32B 5/16* (2013.01); *B32B 5/18* (2013.01); *B32B 19/045* (2013.01);
(Continued)

(58) Field of Classification Search
CPC B29C 48/15; B29K 2075/00; B29K 2627/06; B32B 5/16; B32B 5/18;
(Continued)

(56) References Cited

U.S. PATENT DOCUMENTS 2,861,372 A    11/1958   Hunt
3,135,643 A     6/1964   Michl
(Continued)

FOREIGN PATENT DOCUMENTS

CA     2 406 991 A1    11/2001
CN    104177817 A1    12/2014
(Continued)

OTHER PUBLICATIONS

International Search Report issued in PCT/SE2015/050782, dated Oct. 20, 2015, ISA/SE Patent-och registreringsverket, Stockholm, SE, 6 pages.
(Continued)

*Primary Examiner* — Michael A Tolin
(74) *Attorney, Agent, or Firm* — Boone IP Law

(57) ABSTRACT

A method to produce a wear resistant foil, including providing a first foil including a first thermoplastic material, applying wear resistant particles on the first foil, applying a second foil including a second thermoplastic material on the first foil, and adhering the first foil and the second foil to each other to form a wear resistant foil.

16 Claims, 3 Drawing Sheets

Related U.S. Application Data continuation of application No. 14/790,774, filed on Jul. 2, 2015, now Pat. No. 10,059,084.

(51) Int. Cl.

| | | |
|---|---|---|
| *B32B 27/08* | (2006.01) | |
| *B32B 27/14* | (2006.01) | |
| *B32B 27/20* | (2006.01) | |
| *B32B 27/30* | (2006.01) | |
| *B32B 27/40* | (2006.01) | |
| *B32B 37/10* | (2006.01) | |
| *B32B 27/32* | (2006.01) | |
| *B32B 27/36* | (2006.01) | |
| *B32B 5/16* | (2006.01) | |
| *B32B 33/00* | (2006.01) | |
| *B32B 37/24* | (2006.01) | |
| *B32B 5/18* | (2006.01) | |
| *B32B 27/06* | (2006.01) | |
| *B32B 27/22* | (2006.01) | |
| *B32B 21/08* | (2006.01) | |
| *B32B 21/02* | (2006.01) | |
| *B32B 21/12* | (2006.01) | |
| *B32B 19/04* | (2006.01) | |
| *E04F 15/10* | (2006.01) | |
| *B32B 37/14* | (2006.01) | |
| *B29C 48/15* | (2019.01) | |
| *B32B 37/15* | (2006.01) | |
| *B32B 37/22* | (2006.01) | |
| *B32B 38/06* | (2006.01) | |
| *B32B 38/00* | (2006.01) | |
| *B32B 37/12* | (2006.01) | |

(52) U.S. Cl.
CPC ............ *B32B 19/048* (2013.01); *B32B 21/02* (2013.01); *B32B 21/08* (2013.01); *B32B 21/12* (2013.01); *B32B 27/065* (2013.01); *B32B 27/14* (2013.01); *B32B 27/20* (2013.01); *B32B 27/22* (2013.01); *B32B 27/304* (2013.01); *B32B 27/32* (2013.01); *B32B 27/36* (2013.01); *B32B 27/365* (2013.01); *B32B 27/40* (2013.01); *B32B 33/00* (2013.01); *B32B 37/10* (2013.01); *B32B 37/14* (2013.01); *B32B 37/24* (2013.01); *E04F 15/105* (2013.01); *E04F 15/107* (2013.01); *B29C 48/15* (2019.02); *B29K 2075/00* (2013.01); *B29K 2627/06* (2013.01); *B32B 37/1027* (2013.01); *B32B 37/12* (2013.01); *B32B 37/153* (2013.01); *B32B 37/223* (2013.01); *B32B 38/06* (2013.01); *B32B 38/145* (2013.01); *B32B 2250/02* (2013.01); *B32B 2250/24* (2013.01); *B32B 2250/246* (2013.01); *B32B 2250/40* (2013.01); *B32B 2264/02* (2013.01); *B32B 2264/067* (2013.01); *B32B 2264/10* (2013.01); *B32B 2264/101* (2013.01); *B32B 2264/102* (2013.01); *B32B 2264/107* (2013.01); *B32B 2264/12* (2013.01); *B32B 2270/00* (2013.01); *B32B 2307/412* (2013.01); *B32B 2307/554* (2013.01); *B32B 2307/584* (2013.01); *B32B 2307/744* (2013.01); *B32B 2309/105* (2013.01); *B32B 2317/16* (2013.01); *B32B 2419/00* (2013.01); *B32B 2419/04* (2013.01); *B32B 2471/00* (2013.01)

(58) Field of Classification Search
CPC ..... B32B 17/02; B32B 17/064; B32B 17/068; B32B 19/045; B32B 19/048; B32B 21/02; B32B 21/08; B32B 21/12; B32B 27/065; B32B 27/08; B32B 27/14; B32B 27/20; B32B 27/22; B32B 27/30; B32B 27/302; B32B 27/304; B32B 27/308; B32B 27/32; B32B 27/36; B32B 27/365; B32B 27/40; B32B 33/00; B32B 37/10; B32B 37/1027; B32B 37/12; B32B 37/14; B32B 37/153; B32B 37/223; B32B 37/24; B32B 38/06; B32B 38/145; B32B 2250/02; B32B 2250/24; B32B 2250/246; B32B 2250/40; B32B 2260/025; B32B 2264/02; B32B 2264/067; B32B 2264/10; B32B 2264/101; B32B 2264/102; B32B 2264/107; B32B 2264/12; B32B 2270/00; B32B 2307/412; B32B 2307/554; B32B 2307/584; B32B 2307/744; B32B 2309/105; B32B 2317/16; B32B 2323/04; B32B 2323/10; B32B 2325/00; B32B 2327/06; B32B 2333/08; B32B 2333/12; B32B 2367/00; B32B 2369/00; B32B 2375/00; B32B 2419/00; B32B 2419/04; B32B 2471/00; B44C 5/04; E04F 15/10; E04F 15/102; E04F 15/105; E04F 15/107
See application file for complete search history.

(56) References Cited

U.S. PATENT DOCUMENTS

| | | |
|---|---|---|
| 3,286,006 A | 11/1966 | Annand |
| 3,308,013 A | 3/1967 | Bryant |
| 3,887,678 A | 6/1975 | Lewicki, Jr. |
| 4,092,198 A | 5/1978 | Scher |
| 4,093,766 A | 6/1978 | Scher |
| 4,255,480 A | 3/1981 | Scher |
| 4,256,793 A | 3/1981 | Cannady, Jr. et al. |
| 4,376,147 A | 3/1983 | Byrne et al. |
| 4,430,375 A | 2/1984 | Scher |
| 4,450,194 A | 5/1984 | Kauffman et al. |
| 4,615,090 A | 10/1986 | Baus |
| 4,756,856 A | 7/1988 | Choinski |
| 4,916,007 A | 4/1990 | Manning |
| 5,112,671 A | 5/1992 | Diamond |
| 5,188,876 A | 2/1993 | Hensel et al. |
| 5,266,384 A | 11/1993 | O'Dell |
| 5,466,511 A | 11/1995 | O'Dell et al. |
| 5,543,193 A | 8/1996 | Tesch |
| 5,547,741 A | 8/1996 | Wilson |
| 5,604,025 A | 2/1997 | Tesch |
| 5,662,977 A | 9/1997 | Spain |
| 5,670,237 A | 9/1997 | Shultz et al. |
| 5,766,522 A | 6/1998 | Daly et al. |
| 5,787,655 A | 8/1998 | Saylor, Jr. |
| 5,855,832 A | 1/1999 | Clausi |
| 6,013,222 A | 1/2000 | Douglas et al. |
| 6,103,377 A | 8/2000 | Clausi |
| 6,218,001 B1 | 4/2001 | Chen |
| 6,423,167 B1 | 7/2002 | Palmer et al. |
| 6,444,075 B1 | 9/2002 | Schneider et al. |
| 6,468,645 B1 | 10/2002 | Clausi |
| 6,579,610 B1 | 6/2003 | Shortland |
| 6,617,009 B1 | 9/2003 | Chen et al. |
| 6,666,951 B1 | 12/2003 | Kostiw |
| 6,675,545 B2 | 1/2004 | Chen et al. |
| 6,761,008 B2 | 7/2004 | Chen et al. |
| 6,803,110 B2 | 10/2004 | Drees et al. |
| 6,926,954 B2 | 8/2005 | Schuren et al. |
| 6,986,934 B2 | 1/2006 | Chen et al. |
| 7,169,460 B1 | 1/2007 | Chen et al. |
| 7,211,310 B2 | 5/2007 | Chen et al. |
| 7,276,265 B2 | 10/2007 | Sigel et al. |
| 7,419,717 B2 | 9/2008 | Chen et al. |
| 7,568,322 B2 | 8/2009 | Pervan et al. |
| 7,576,140 B2 | 8/2009 | Tamaki et al. |
| 7,584,583 B2 | 9/2009 | Bergelin et al. |

(56) References Cited

U.S. PATENT DOCUMENTS

| | | |
|---|---|---|
| 7,763,345 B2 | 7/2010 | Chen et al. |
| 7,802,415 B2 | 9/2010 | Pervan |
| 7,816,000 B2 | 10/2010 | Sparks et al. |
| 7,886,497 B2 | 2/2011 | Pervan et al. |
| 7,930,862 B2 | 4/2011 | Bergelin et al. |
| 8,021,741 B2 | 9/2011 | Chen et al. |
| 8,028,486 B2 | 10/2011 | Pervan |
| 8,043,661 B2 | 10/2011 | Linnemann |
| 8,112,891 B2 | 2/2012 | Pervan |
| 8,245,478 B2 | 8/2012 | Bergelin et al. |
| 8,293,058 B2 | 10/2012 | Pervan et al. |
| 8,365,499 B2 | 2/2013 | Nilsson et al. |
| 8,480,841 B2 | 7/2013 | Pervan et al. |
| 8,511,031 B2 | 8/2013 | Bergelin et al. |
| 8,584,423 B2 | 11/2013 | Pervan et al. |
| 8,613,826 B2 | 12/2013 | Pervan et al. |
| 8,658,274 B2 | 2/2014 | Chen et al. |
| 8,756,899 B2 | 6/2014 | Nilsson et al. |
| 8,800,150 B2 | 8/2014 | Pervan |
| 8,833,028 B2 | 9/2014 | Whispell et al. |
| 8,834,992 B2 | 9/2014 | Chen et al. |
| 8,973,270 B2 | 3/2015 | Siebert et al. |
| 9,194,133 B2 | 11/2015 | Thiers |
| 9,200,460 B2 | 12/2015 | Cappelle |
| 9,222,267 B2 | 12/2015 | Bergelin et al. |
| 9,249,581 B2 | 2/2016 | Nilsson et al. |
| 9,296,191 B2 | 3/2016 | Pervan et al. |
| 9,314,936 B2 | 4/2016 | Pervan |
| 9,410,328 B2 | 8/2016 | Pervan |
| 9,670,371 B2 | 6/2017 | Pervan et al. |
| 9,695,601 B2 | 7/2017 | Whispell et al. |
| 9,714,515 B2 | 7/2017 | Pervan |
| 9,765,530 B2 | 9/2017 | Bergelin et al. |
| 10,047,527 B2 | 8/2018 | Nilsson et al. |
| 10,059,084 B2 | 8/2018 | Lundblad et al. |
| 10,137,659 B2 | 11/2018 | Pervan |
| 10,287,777 B2 | 5/2019 | Boo et al. |
| 10,301,830 B2 | 5/2019 | Boo |
| 10,316,526 B2 | 6/2019 | Kell |
| 10,344,379 B2 | 7/2019 | Pervan et al. |
| 10,407,919 B2 | 9/2019 | Boo |
| 10,450,760 B2 | 10/2019 | Bergelin et al. |
| 10,486,399 B2 | 11/2019 | Chen et al. |
| 10,493,731 B2 | 12/2019 | Lundblad et al. |
| 10,526,793 B2 | 1/2020 | Nilsson et al. |
| 10,704,269 B2 | 7/2020 | Whispell et al. |
| 10,780,676 B2 | 9/2020 | Lundblad et al. |
| 10,808,410 B2 | 10/2020 | Boo et al. |
| 10,837,181 B2 | 11/2020 | Josefsson et al. |
| 10,844,612 B2 | 11/2020 | Boo |
| 10,851,549 B2 | 12/2020 | Boo |
| 10,865,571 B2 | 12/2020 | Kell |
| 10,975,580 B2 | 4/2021 | Pervan et al. |
| 10,982,449 B2 | 4/2021 | Kell |
| 11,066,836 B2 | 7/2021 | Bergelin et al. |
| 11,306,486 B2 | 4/2022 | Nilsson et al. |
| 11,359,387 B2 | 6/2022 | Whispell et al. |
| 2001/0021431 A1 | 9/2001 | Chen |
| 2002/0031646 A1 | 3/2002 | Chen |
| 2002/0142135 A1 | 10/2002 | Chen et al. |
| 2002/0146568 A1 | 10/2002 | Ho et al. |
| 2003/0024199 A1 | 2/2003 | Pervan |
| 2003/0055145 A1 | 3/2003 | Safta et al. |
| 2003/0059639 A1 | 3/2003 | Worsley |
| 2003/0072919 A1 | 4/2003 | Watts, Jr. et al. |
| 2004/0048044 A1 | 3/2004 | Schneider |
| 2004/0206036 A1 | 10/2004 | Pervan |
| 2004/0241416 A1 | 12/2004 | Tian |
| 2005/0003160 A1 | 1/2005 | Chen et al. |
| 2005/0107006 A1 | 5/2005 | Makino |
| 2005/0210810 A1 | 9/2005 | Pervan |
| 2006/0130421 A1 | 6/2006 | Nollet et al. |
| 2006/0191861 A1 | 8/2006 | Mitterhofer |
| 2007/0175148 A1 | 8/2007 | Bergelin et al. |
| 2007/0196624 A1 | 8/2007 | Chen et al. |
| 2008/0000183 A1 | 1/2008 | Bergelin et al. |
| 2008/0000188 A1 | 1/2008 | Pervan |
| 2008/0010924 A1 | 1/2008 | Pietruczynik |
| 2008/0032120 A1 | 2/2008 | Braun |
| 2008/0063844 A1 | 3/2008 | Chen et al. |
| 2008/0075882 A1 | 3/2008 | Hayata |
| 2008/0172971 A1 | 7/2008 | Pervan |
| 2008/0256890 A1 | 10/2008 | Pervan |
| 2008/0311355 A1 | 12/2008 | Chen et al. |
| 2009/0078129 A1 | 3/2009 | Cappelle |
| 2009/0120731 A1 | 5/2009 | Thompson et al. |
| 2009/0151866 A1 | 6/2009 | Endert |
| 2009/0155612 A1 | 6/2009 | Pervan |
| 2009/0208646 A1 | 8/2009 | Kreuder et al. |
| 2010/0092731 A1 | 4/2010 | Pervan et al. |
| 2010/0152361 A1 | 6/2010 | Weaver et al. |
| 2010/0166967 A1 | 7/2010 | Chisaka |
| 2010/0223881 A1 | 9/2010 | Kalwa |
| 2010/0260962 A1 | 10/2010 | Chen et al. |
| 2010/0300030 A1 | 12/2010 | Pervan |
| 2010/0319282 A1 | 12/2010 | Ruland |
| 2010/0323187 A1 | 12/2010 | Kalwa |
| 2011/0041996 A1 | 2/2011 | Pervan |
| 2011/0056167 A1 | 3/2011 | Nilsson et al. |
| 2011/0104431 A1 | 5/2011 | Niedermaier |
| 2011/0131901 A1 | 6/2011 | Pervan et al. |
| 2011/0154763 A1 | 6/2011 | Bergelin et al. |
| 2011/0167744 A1 | 7/2011 | Whispell et al. |
| 2011/0177354 A1 | 7/2011 | Ziegler et al. |
| 2011/0223342 A1 | 9/2011 | Iyer et al. |
| 2011/0247748 A1 | 10/2011 | Pervan et al. |
| 2011/0287237 A1 | 11/2011 | Riebel |
| 2011/0300393 A1 | 12/2011 | Iio et al. |
| 2011/0318507 A1 | 12/2011 | Meersseman |
| 2012/0003439 A1 | 1/2012 | Chen et al. |
| 2012/0040149 A1 | 2/2012 | Chen et al. |
| 2012/0137617 A1 | 6/2012 | Pervan |
| 2012/0216947 A1 | 8/2012 | Huber |
| 2012/0279154 A1 | 11/2012 | Bergelin et al. |
| 2013/0014890 A1 | 1/2013 | Pervan et al. |
| 2013/0014891 A1 | 1/2013 | Vandevoorde |
| 2013/0047536 A1 | 2/2013 | Pervan |
| 2013/0052437 A1 | 2/2013 | Barth |
| 2013/0095343 A1 | 4/2013 | Arsene |
| 2013/0111758 A1 | 5/2013 | Nilsson et al. |
| 2013/0269863 A1 | 10/2013 | Pervan et al. |
| 2013/0298487 A1 | 11/2013 | Bergelin et al. |
| 2013/0299454 A1 | 11/2013 | Marxen et al. |
| 2014/0017452 A1 | 1/2014 | Pervan et al. |
| 2014/0023832 A1 | 1/2014 | Pervan |
| 2014/0033635 A1 | 2/2014 | Pervan et al. |
| 2014/0115994 A1 | 5/2014 | Pervan |
| 2014/0141239 A1 | 5/2014 | Ilfrey |
| 2014/0144583 A1 | 5/2014 | Hakansson et al. |
| 2014/0147585 A1 | 5/2014 | Smith |
| 2014/0196618 A1 | 7/2014 | Pervan |
| 2014/0220318 A1 | 8/2014 | Pervan |
| 2014/0237924 A1 | 8/2014 | Nilsson et al. |
| 2014/0283466 A1 | 9/2014 | Boo |
| 2014/0290171 A1 | 10/2014 | Vermeulen |
| 2014/0318061 A1 | 10/2014 | Pervan |
| 2014/0352248 A1 | 12/2014 | Whispell |
| 2014/0356594 A1 | 12/2014 | Chen et al. |
| 2015/0056416 A1 | 2/2015 | Maesen |
| 2015/0072111 A1 | 3/2015 | Rischer et al. |
| 2015/0158330 A1 | 6/2015 | Stoffel |
| 2015/0225964 A1 | 8/2015 | Chen et al. |
| 2015/0251486 A1 | 9/2015 | Hannig |
| 2015/0258716 A1 | 9/2015 | Hannig |
| 2016/0016390 A1 | 1/2016 | Lundblad et al. |
| 2016/0016391 A1 | 1/2016 | Lundblad et al. |
| 2016/0052245 A1 | 2/2016 | Chen et al. |
| 2016/0069089 A1 | 3/2016 | Bergelin et al. |
| 2016/0082625 A1 | 3/2016 | Luukko et al. |
| 2016/0108624 A1 | 4/2016 | Nilsson et al. |
| 2016/0144433 A1 | 5/2016 | Stoffel |
| 2016/0186318 A1 | 6/2016 | Pervan et al. |
| 2016/0194883 A1 | 7/2016 | Pervan |
| 2016/0194885 A1 | 7/2016 | Whispell et al. |

(56) References Cited

U.S. PATENT DOCUMENTS

| | | |
|---|---|---|
| 2016/0201324 A1 | 7/2016 | Håkansson et al. |
| 2016/0265234 A1 | 9/2016 | Pervan |
| 2017/0037642 A1 | 2/2017 | Boo |
| 2017/0037645 A1 | 2/2017 | Pervan |
| 2017/0175400 A1 | 6/2017 | Joseffson et al. |
| 2017/0232761 A1 | 8/2017 | Pervan |
| 2017/0241136 A1 | 8/2017 | Kell |
| 2017/0348984 A1 | 12/2017 | Pervan |
| 2017/0350140 A1 | 12/2017 | Bergelin et al. |
| 2018/0094441 A1 | 4/2018 | Boo |
| 2018/0313093 A1 | 11/2018 | Nilsson et al. |
| 2018/0339504 A1 | 11/2018 | Ziegler |
| 2019/0091977 A1 | 3/2019 | Lundblad et al. |
| 2019/0211569 A1 | 7/2019 | Boo et al. |
| 2019/0249444 A1 | 8/2019 | Kell |
| 2019/0277041 A1 | 9/2019 | Pervan |
| 2020/0056379 A1 | 2/2020 | Boo |
| 2020/0063441 A1 | 2/2020 | Boo |
| 2020/0180282 A1 | 6/2020 | Lundblad et al. |
| 2020/0208409 A1 | 7/2020 | Kell |
| 2020/0248462 A1 | 8/2020 | Bergelin et al. |
| 2020/0362567 A1 | 11/2020 | Nilsson et al. |
| 2020/0407981 A1 | 12/2020 | Boo et al. |
| 2021/0115680 A1 | 4/2021 | Whispell et al. |
| 2021/0207385 A1 | 7/2021 | Boo |
| 2021/0214953 A1 | 7/2021 | Kell |
| 2021/0230881 A1 | 7/2021 | Boo |
| 2022/0112726 A1 | 4/2022 | Bergelin et al. |

FOREIGN PATENT DOCUMENTS

| | | |
|---|---|---|
| DE | 1 815 312 A1 | 7/1969 |
| DE | 103 16 886 A1 | 10/2004 |
| DE | 10 2007 046 532 B3 | 10/2008 |
| EP | 0 732 449 A1 | 9/1996 |
| EP | 0 865 351 A1 | 9/1998 |
| EP | 0 732 449 B1 | 8/1999 |
| EP | 1 209 199 A1 | 5/2002 |
| EP | 0 865 351 B1 | 2/2003 |
| EP | 1 847 385 A1 | 10/2007 |
| EP | 1 961 556 A1 | 8/2008 |
| EP | 2 123 476 A2 | 11/2009 |
| EP | 2 246 500 A2 | 11/2010 |
| EP | 2 263 867 A1 | 12/2010 |
| EP | 2 264 259 A2 | 12/2010 |
| EP | 2 272 667 A1 | 1/2011 |
| EP | 2 272 668 A1 | 1/2011 |
| EP | 2 305 462 A1 | 4/2011 |
| EP | 1 847 385 B1 | 9/2011 |
| EP | 2 263 867 B1 | 3/2012 |
| EP | 2 789 501 A1 | 10/2014 |
| GB | 984 170 A | 2/1965 |
| GB | 1 090 450 | 11/1967 |
| GB | 2 262 940 A | 7/1993 |
| JP | 2001-113664 A | 4/2001 |
| JP | 2001-328210 A | 11/2001 |
| NZ | 225556 | 2/1992 |
| WO | WO 90/06970 A1 | 6/1990 |
| WO | WO 92/06832 A1 | 4/1992 |
| WO | WO 94/00280 A1 | 1/1994 |
| WO | WO 01/92037 A2 | 12/2001 |
| WO | WO 2006/013469 A1 | 2/2006 |
| WO | WO 2007/015669 A2 | 2/2007 |
| WO | WO 2007/015669 A3 | 2/2007 |
| WO | WO 2008/004960 A2 | 1/2008 |
| WO | WO 2008/004960 A3 | 1/2008 |
| WO | WO 2008/004960 A8 | 1/2008 |
| WO | WO 2009/065769 A2 | 5/2009 |
| WO | WO 2009/065769 A3 | 5/2009 |
| WO | WO 2009/116926 A1 | 9/2009 |
| WO | WO 2009/124704 A1 | 10/2009 |
| WO | WO 2010/087752 A1 | 8/2010 |
| WO | WO 2011/082491 A1 | 7/2011 |
| WO | WO 2011/087422 A1 | 7/2011 |
| WO | WO 2011/129755 A2 | 10/2011 |
| WO | WO 2011/129757 A1 | 10/2011 |
| WO | WO 2011/141849 A2 | 11/2011 |
| WO | WO 2011/141849 A3 | 11/2011 |
| WO | WO 2013/079950 A1 | 6/2013 |
| WO | WO 2016/010471 A1 | 1/2016 |
| WO | WO 2016/010472 A1 | 1/2016 |

OTHER PUBLICATIONS

Extended European Search Report issued in EP15822018.6, dated Nov. 17, 2017, European Patent Office, Munich, DE, 8 pages.

International Search Report issued in PCT/SE2015/050783, dated Oct. 20, 2015, ISA/SE Patent-och registreringsverket, Stockholm, SE, 6 pages.

Extended European Search Report issued in EP 15822782.7, dated Nov. 17, 2017, European Patent Office, Munich, DE, 8 pages.

BTLSR Toledo, Inc. website. http://www.btlresins.com/more.html. "Advantages to Using Powdered Resins," May 26, 2007, 2 pages, per the Internet Archive WayBackMachine.

Floor Daily, "Shaw Laminates: Green by Design," Aug. 13, 2007, 1 pg, Dalton, GA.

Le Fur, X., et al., "Recycling melamine-impregnated paper waste as board adhesives," published online Oct. 26, 2004, pp. 419-423, vol. 62, Springer-Verlag, DE.

Nimz, H.H., "Wood," Ullmann's Encyclopedia of Industrial Chemistry, published online Jun. 15, 2000, pp. 453-505, vol. 39, Wiley-VCH Verlag GmbH & Co. KgaA, Weinheim, DE.

Odian, George, "Principles of Polymerization," 1991, 3$^{rd}$ Edition, 5 pages incl. pp. 122-123, John Wiley & Sons, Inc., New York, NY, USA.

Parquet International, "Digital Printing is still an expensive process," Mar. 2008, cover page/pp. 78-79, www.parkettmagazin.com.

Sichuan Jieyang Building Materials Co., Ltd., "PVC Flooring Planks With Good Quality," China PVC Flooring; 2013 (retrieved Jun. 26, 2014), 3 pages, http://harjorflooring.en.made-in-china.com/product/vXFxYDICmks/China-PVC-Flooring-Planks-with-Good-Quality.html.

METHOD TO PRODUCE A THERMOPLASTIC WEAR RESISTANT FOIL

CROSS REFERENCE TO RELATED APPLICATIONS

The present application is a continuation of U.S. application Ser. No. 16/113,333, filed on Aug. 27, 2018, now U.S. Pat. No. 10,780,676, which is a continuation of U.S. application Ser. No. 14/790,774, filed on Jul. 2, 2015, now U.S. Pat. No. 10,059,084, which claims priority to Swedish Application Nos. 1550455-8, filed on Apr. 16, 2015, 1450895-6, filed on Jul. 16, 2014, and 1450894-9, filed on Jul. 16, 2014. The entire contents of each of U.S. application Ser. No. 16/113,333, U.S. application Ser. No. 14/790,774, and Swedish Application Nos. 1550455-8, 1450895-6, and 1450894-9 are hereby incorporated herein by reference in their entirety.

FIELD OF THE DISCLOSURE

The present disclosure relates to a method to produce a thermoplastic wear resistant foil, a method to produce a building panel including such a thermoplastic wear resistant foil, and a building panel.

TECHNICAL BACKGROUND

In recent years, so-called Luxury Vinyl Tiles and Planks (LVT) have gained increasing success. These types of floor panels usually comprise a thermoplastic core, a thermoplastic décor layer arranged on the core, a transparent wear layer on the décor layer, and a coating applied on the wear layer. The thermoplastic material is often PVC. The wear layer is conventionally a PVC foil, for example, having a thickness of 0.2-0.7 mm. The coating applied on the wear layer is conventionally a UV curing polyurethane coating. The wear layer together with the coating provides the wear resistance of the floor panel and protects the décor layer.

However, when subjecting floor panels to wear, it has been shown that the coating and the wear layer are relatively easily worn down, or at least worn such that the appearance of the wear layer is affected, such as having scratches and/or not being transparent any longer. Compared to a conventional laminate floor panel, the wear resistance of a LVT floor panel is inferior. However, LVT floors offer several advantages over, for example, laminate floors, such as deep embossing, dimensional stability related to humidity, moisture resistance and sound absorbing properties.

It is therefore desirable to provide a LVT product having improved wear resistance. It is also desirable to simplify the build up of LVT product.

It is known from US 2008/0063844 to apply a surface coating including aluminum oxide on a resilient floor covering. The coating is a wet coating.

WO 2013/079950 discloses an anti-skid floor covering comprising at least two transparent polymer layers, wherein particles of an aggregate material having an average particle size of between about 0.05 mm to about 0.8 mm are located between and/or within the two or more polymer layers. The particles improve the slip resistance of the floor covering.

SUMMARY

It is an object of at least embodiments of the present disclosure to provide an improvement over the above described techniques and known art.

A further object of at least embodiments of the present disclosure is to improve the wear resistance of LVT floorings.

A further object of at least embodiments of the present disclosure is to simplify the buildup of LVT floorings.

At least some of these and other objects and advantages that will be apparent from the description have been achieved by a method to produce a wear resistant foil according to a first aspect. The method includes providing a first foil comprising a first thermoplastic material, applying a second foil comprising a second thermoplastic material on the first foil, applying wear resistant particles on the first foil and/or on the second foil prior to applying the second foil on the first foil, and adhering the first foil and to the second foil with the wear resistant particles there between for forming a wear resistant foil.

The first and the second foil may comprise different thermoplastic material, or may comprise thermoplastic material of the same type.

The wear resistant particles may be applied on the first foil.

The first and the second foil may be adhered by pressing the first foil and the second foil together.

An advantage of at least embodiments of the present disclosure is that a wear resistant foil having improved wear resistance is provided. By including wear resistant particles in the wear resistant foil, the wear resistant particles provide additional wear resistance to the thermoplastic materials of the first and the second foil. The wear resistance of the foil is improved compared to a conventional wear layer of LVT products.

Furthermore, conventional coatings, for example a UV curable polyurethane (PU) coating conventionally applied on the wear layer, may be replaced by using the wear resistant foil according to the disclosure instead. A conventional coating step may be replaced by arranging a single foil. Thereby, the production process is simplified and the number of steps in the production process is reduced by arranging a wear resistant foil having improved wear resistant properties instead of several layers or coatings.

By using different thermoplastic material in the first and the second foil, it is possible to benefit from different thermoplastic material having different properties. The desired properties of the material of the first foil may differ from the desired properties of the second foil. For the second foil, properties such as stain resistance and scratch resistance are important, and the material of the second foil can be chosen to match these criteria. Usually, suitable thermoplastic material for the second foil may be more expensive compared to thermoplastic material used as, for example, in printed film or as core material. By only using such thermoplastic material in the second foil, the cost of the wear resistant foil can be controlled. Further, the second foil can have a layer thickness being less than a layer thickness of the first foil. By choosing different thermoplastic materials for the first and second foil, the thermoplastic materials can be used in an efficient and cost effective manner. By adjusting the layer thickness of the first and second foil, the materials can be used in an even more efficient manner.

The object of the wear resistant particles is to provide wear resistance of the foil when being worn, not to provide slip resistance.

The wear resistant foil is preferably transparent, or at least substantially transparent, for example, having a light transmittance index exceeding 80%, preferably exceeding 90%. Thereby, any decorative layer or decorative print is visible through the wear resistant foil. Preferably, the wear resistant foil does not influence of the impression of any decorative layer or decorative print arranged beneath the wear resistant foil. The wear resistant foil is preferably non-pigmented.

The wear resistant particles may be enclosed by the first and the second foil after being adhered to each other. The wear resistant particles may be encapsulated by the second foil. Preferably, the wear resistant particles do not protrude from a surface of the second foil being opposite the first foil. If the wear resistant particles protrude beyond the surface of the second foil, the wear resistance foil will cause wear on items placed on the wear resistance foil. For example, when the wear resistant foil is used as a top surface of a flooring, protruding wear resistant particles will cause wear on socks, shoes, etc. Further, protruding wear resistant particles would cause a rough and/or harsh surface of the wear resistant foil, as provided by a slip resistant surface. The aim of the wear resistant particles enclosed by the foils is to provide wear resistance when the second foil is worn, not to provide slip resistance.

The first thermoplastic material may be or comprise polyvinyl chloride (PVC).

The second thermoplastic material may be or comprise polyurethane (PU). By arranging a second foil comprising polyurethane, no additional polyurethane containing coating has to be provided on top of the wear resistant foil. Thereby, the layered structure of a LVT product may be simplified. Furthermore, compared to for example a conventional wear layer substantially consisting of PVC, a wear resistant foil comprising an upper portion of polyurethane (PU) obtains improved chemical resistance. Its scuff resistance and micro scratch resistance are also improved. An upper layer of polyurethane (PU) also provides improved resistance against black heel marks. An additional advantage is that curable polyurethane, such as UV curable polyurethane, shrinks when curing. By pressing a thermoplastic polyurethane (PU) material, no or at least reduced shrinking occurs.

The first foil may substantially consist of the thermoplastic material, preferably polyvinyl chloride, and optionally additives. Additives may be plasticizers, stabilizers, lubricants, degassing agents, coupling agents, compatibilizers, crosslinking agents, etc.

The first foil may be a decorative foil. The first foil may be printed, for example by digital printing, direct printing, rotogravure printing, etc.

The second foil may substantially consist of the thermoplastic material, preferably polyurethane, and optionally additives. Additives may be plasticizers, stabilizers, lubricants, degassing agents, coupling agents, compatibilizers, crosslinking agents, etc.

In one embodiment, the first thermoplastic material may be or comprise polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof.

In one embodiment, the second thermoplastic material may be or comprise polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof.

The wear resistant particles may preferably comprise aluminum oxide. The wear resistant particles may comprise aluminum oxide such as corundum, carborundum, quartz, silica, glass, glass beads, glass spheres, silicon carbide, diamond particles, hard plastics, reinforced polymers and organics, or a combination thereof.

The wear resistant particles may have an average particle size of less than 45 μm.

The wear resistant particles may have a refractive index similar to the refractive index of the second foil. The wear resistant particles may have a refractive index of 1.4-1.7. In one embodiment, the wear resistant particle may have a refractive index of 1.4-1.9, preferably 1.5-1.8, for example, 1.7-1.8. The refractive index of the wear resistant particles may not differ from the refractive index of the second foil more than ±20%.

A thickness of the second foil may be less than 75 μm, for example, such as about 50 μm, after the wear resistant foil has been formed, such as after pressing.

The wear resistant particles may have an average particle size being less than the thickness of the second foil. The wear resistant particles may have an average particle size being larger than the thickness of the second foil. However, during pressing, the wear resistant particles are pressed into the first foil such that the wear resistant particles do not protrude beyond an upper surface of the second foil after pressing, although the wear resistant particles having an average particle size exceeding the thickness of the second foil.

The ratio between the average particle size of the wear resistant particles and the thickness of the second foil may be less than 1.5:1.

The thickness of the second foil may be less than the thickness of the first foil.

The method may further comprise applying scratch resistant particles on the second foil and/or the first foil. The scratch resistant particles may be or comprise nano-sized silica particles, preferably fused silica particles. The scratch resistant particles may be or comprise aluminum oxide.

Pressing the first and second foils together may comprise calendering the first and the second foil together.

The second foil may be formed by an extrusion process, such as extrusion coating or extrusion lamination, preferably in connection with forming the wear resistant foil. The first foil may be formed by an extrusion process such as extrusion coating or extrusion coating.

According to a second aspect, a method of forming a building panel is provided. The method comprises applying a wear resistant foil produced according to the first aspect on a core, and adhering the wear resistant foil to the core for forming a building panel.

The wear resistant foil may be adhered to the core by pressing the wear resistant foil and the core together.

The core may be provided with a decorative layer. The core may be provided with a print on a surface of the core. The wear resistant foil is arranged on the decorative layer, or on the print.

The core may comprise a third thermoplastic material. The core may be a thermoplastic core, a WPC (Wood Plastic Composite), etc. The third thermoplastic material may be or comprise polyvinyl chloride (PVC), polyester, polypropylene (PP), polyethylene (PE), polystyrene (PS), polyurethane (PU), polyethylene terephthalate (PET), polyacrylate, methacrylate, polyvinyl butyral, or a combination thereof. The core may be provided with several layers. The core may be foamed.

According to a third aspect, a method to produce a building panel is provided. The method includes providing a core, applying a first foil comprising a first thermoplastic material on the core, applying a second foil comprising a second thermoplastic material on the first foil, applying wear resistant particles on the first foil and/or on the second foil prior to applying the second foil on the first foil, and adhering the core, the first foil, and the second foil to each other to form a building panel.

The first and the second foil may comprise different thermoplastic material, or may comprise thermoplastic material of the same type.

In one embodiment, the wear resistant foil is produced in connection with when forming the building panel. The first and second foil may be laminated together when laminating any other layer, for example a decorative layer, a balancing layer, etc., to the core.

The wear resistant particles may be applied on the first foil.

The core, the first foil and the second foil may be adhered to each other by pressing the core, the first foil and the second foil together to form the building panel.

An advantage of at least embodiments of the present disclosure is that a wear resistant foil having improved wear resistance is provided. By including wear resistant particles in the wear resistant foil, the wear resistant particles provide additional wear resistance to the thermoplastic materials of the first and the second foil. The wear resistance of the foil is improved compared to a conventional wear layer of LVT products.

Furthermore, conventional coatings, for example a UV curable polyurethane (PU) coating conventionally applied on the wear layer, may be replaced by using the wear resistant foil according to the disclosure instead. A conventional coating step may be replaced by arranging a single foil. Thereby, the production process is simplified and the number of steps in the production process is reduced by arranging a wear resistant foil having improved wear resistant properties instead of several layers or coatings.

By using different thermoplastic material in the first and the second foil, it is possible to benefit from different thermoplastic material having different properties. The desired properties of the material of the first foil may differ from the desired properties of the second foil. For the second foil, properties such as stain resistance and scratch resistance are important, and the material of the second foil can be chosen to match these criteria. Usually, suitable thermoplastic material for the second foil may be more expensive compared to thermoplastic material used as, for example, in printed film or as core material. By only using such thermoplastic material in the second foil, the cost of the wear resistant foil can be controlled. Further, the second foil can have a layer thickness being less a layer thickness of the first foil. By choosing different thermoplastic materials for the first and second foil, the thermoplastic materials can be used in an efficient and cost effective manner. By adjusting the layer thickness of the first and second foil, the materials can be used in an even more efficient manner.

The object of the wear resistant particles is to provide wear resistance of the foil when being worn, not to provide slip resistance.

The wear resistant foil is preferably transparent, or at least substantially transparent, for example, having a light transmittance index exceeding 80%, preferably exceeding 90%.

Thereby, any decorative layer or decorative print is visible through the wear resistant foil. Preferably, the wear resistant foil does not influence the impression of any decorative layer or decorative print arranged beneath the wear resistant foil. The wear resistant foil is preferably non-pigmented.

The wear resistant particles may be enclosed by the first and the second foil after being adhered to each other. The wear resistant particles may be encapsulated by the second foil. Preferably, the wear resistant particles do not protrude from a surface of the second foil being opposite the first foil.

If the wear resistant particles protrude beyond the surface of the second foil, the wear resistance foil will cause wear on items placed on the wear resistance foil. For example, when the wear resistant foil is used as a top surface of a flooring, protruding wear resistant particles will cause wear on socks, shoes, etc. Further, protruding wear resistant particles would cause a rough and/or harsh surface of the wear resistant foil, as provided by a slip resistant surface. The aim of the wear resistant particles enclosed by the foils is to provide wear resistance when the second foil is worn, not to provide slip resistance.

The first thermoplastic material may be or comprise polyvinyl chloride (PVC).

The second thermoplastic material may be or comprise polyurethane (PU). By arranging a second foil comprising polyurethane, no additional polyurethane containing coating has to be provided on top of the wear resistant foil. Thereby, the layered structure of a LVT product may be simplified. Furthermore, compared to for example a conventional wear layer substantially consisting of PVC, a wear resistant foil comprising an upper portion of polyurethane (PU) obtains improved chemical resistance. Its scuff resistance and micro scratch resistance are also improved. An upper layer of polyurethane (PU) also provides improved resistance against black heel marks. An additional advantage is that curable polyurethane, such as UV curable polyurethane, shrinks when curing. By pressing a thermoplastic polyurethane (PU) material, no, or at least reduced, such shrinking occurs.

The first foil may substantially consist of the thermoplastic material, preferably polyvinyl chloride, and optionally additives. Additives may be plasticizers, stabilizers, lubricants, degassing agents, coupling agents, compatibilizers, crosslinking agents, etc.

The first foil may be a decorative foil. The first foil may be printed, for example by digital printing, direct printing, rotogravure printing, etc.

The second foil may substantially consist of the thermoplastic material, preferably polyurethane, and optionally additives. Additives may be plasticizers, stabilizers, lubricants, degassing agents, coupling agents, compatibilizers, crosslinking agents, etc.

In one embodiment, the first thermoplastic material may be or comprise polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof.

In one embodiment, the second thermoplastic material may be or comprise polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof.

The wear resistant particles may preferably comprise aluminum oxide. The wear resistant particles may comprise aluminum oxide such as corundum, carborundum, quartz, silica, glass, glass beads, glass spheres, silicon carbide, diamond particles, hard plastics, reinforced polymers and organics, or a combination thereof.

The wear resistant particles may have an average particle size of less than 45 µm.

The wear resistant particles may have a refractive index similar to the refractive index of the second foil. The wear resistant particles may have a refractive index of 1.4-1.7. In one embodiment, the wear resistant particle may have a refractive index of 1.4-1.9, preferably 1.5-1.8, for example, 1.7-1.8. The refractive index of the wear resistant particles may not differ from the refractive index of the second foil more than ±20%.

A thickness of the second foil may be less than 75 μm, for example, such as about 50 μm, after the wear resistant foil has been formed, such as after pressing.

The wear resistant particles may have an average particle size being less than the thickness of the second foil. The wear resistant particles may have an average particle size being larger than the thickness of the second foil. However, during pressing, the wear resistant particles are pressed into the first foil such that the wear resistant particles do not protrude beyond an upper surface of the second foil after pressing, although the wear resistant particles having an average particle size exceeding the thickness of the second foil.

The ratio between the size of the wear resistant particles and the thickness of the second foil may be less than 1.5:1.

The thickness of the second foil may be less than the thickness of the first foil.

The method may further comprise applying scratch resistant particles on the second foil and/or the first foil. The scratch resistant particles may be or comprise nano-sized silica particles, preferably fused silica particles. The scratch resistant particles may be or comprise aluminum oxide.

Pressing the core, the first foil and the second foil together may comprise calendering the core, first and the second foil together.

The second foil may be formed by an extrusion process, such as extrusion coating or extrusion lamination, preferably in connection with forming the building panel. The first foil may be formed by an extrusion process such as extrusion coating or extrusion coating. The core may be extruded or pressed, such as calendered.

The building panel may be formed in a continuous process.

The core may comprise a third thermoplastic material. The core may be a thermoplastic core, a WPC (Wood Plastic Composite), etc. The third thermoplastic material may be or comprise polyvinyl chloride (PVC), polyester, polypropylene (PP), polyethylene (PE), polystyrene (PS), polyurethane (PU), polyethylene terephthalate (PET), polyacrylate, methacrylate, polyvinyl butyral, or a combination thereof. The core may be provided with several layers. The core may be foamed.

The core may be a wood-based board or a mineral board. The core may, in embodiments, be HDF, MDF, particleboard, OSB, or Wood Plastic Composite (WPC).

A decorative layer may be arranged on the core. The decorative layer may be a thermoplastic layer. The decorative layer may be a wood powder layer comprising a thermosetting binder and lignocellulosic or cellulosic particles. The decorative layer may be a thermoplastic layer applied as a powder, preferably comprising a print printed into the thermoplastic material in powder form. The decorative layer may be a wood veneer layer, a cork layer or a decorative paper.

In one embodiment, the first foil is arranged directly on the core. The core may be provided with a print, and the first foil is arranged on the print. Alternatively, or as a complement, the first foil may be a decorative foil. The first foil may be printed, for example by digital printing, direct printing, rotogravure printing, etc. Preferably, the print is provided on a surface of the first foil facing the core.

The method may further comprise applying a coating on the second foil. The coating may comprise acrylate or methacrylate monomer or acrylate or methacrylate oligomer. The coating may be radiation curing, such as UV curing or electron beam curing.

According to a fourth aspect, a method to produce a building panel is provided. The method comprises providing a core, applying a second foil comprising a second thermoplastic material on the core, applying wear resistant particles on the core and/or the second foil prior to the second foil is applied on the core, and adhering the core and the second foil together to form a building panel.

Embodiments of the fourth aspect incorporate all the advantages of the previous aspects, which previously has been discussed, whereby the previous discussion is applicable also for the building panel.

The wear resistant particles may be applied on the core.

The core and the second foil may be adhered by pressing the core and the second foil together to form the building panel.

The wear resistant particles may be enclosed by the second foil and the core. The wear resistant particles may be encapsulated by the second foil.

The second thermoplastic material may be or comprise polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof.

The wear resistant particles may be aluminum oxide.

The wear resistant may have an average particle size of less than 45 μm.

The wear resistant particles may have a refractive index similar to the refractive index of the second foil. The wear resistant particles may have a refractive index of 1.4-1.7. In one embodiment, the wear resistant particle may have a refractive index of 1.4-1.9, preferably 1.5-1.8, for example, 1.7-1.8. The refractive index of the wear resistant particles may not differ from the refractive index of the second foil more than ±20%.

The core may be a thermoplastic core, a Wood Plastic Composite (WPC), a wood-based board or a mineral board. The core may be polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof. The core may be foamed.

The core may be provided with a decorative layer. The decorative layer may be a printed thermoplastic film, a wood veneer layer, a cork layer, a paper layer. Alternatively, a print may be printed on an upper surface of the core.

A thickness of the second foil may be less than 75 μm, for example, such as about 50 μm, after the building panel has been formed.

The second foil may be formed by an extrusion process such as extrusion coating or extrusion lamination on the core.

By the method according to the fourth aspect, a building panel comprising a core, a wear resistant foil comprising wear resistant particles arranged on the core and a second foil comprising a thermoplastic material arranged on the wear resistant particles and attached to the core.

Embodiment of the third aspect is applicable also for the fourth aspect.

According to a fifth aspect, a building panel is provided. The building panel comprises a core, a wear resistant foil arranged on a surface of the core, wherein the wear resistant foil comprises a first foil comprising a first thermoplastic material and a second foil comprising a second thermoplastic material, and wherein wear resistant particles are arranged between the first and the second foil.

Embodiments of the fifth aspect incorporate the advantages of the first aspect, which previously has been discussed, whereby the previous discussion is applicable also for the building panel.

The first and the second foil may comprise different thermoplastic material, or may comprise thermoplastic material of the same type.

The wear resistant particles may be enclosed by the first foil and the second foil. The wear resistant particles may be encapsulated by the second foil.

The first thermoplastic material may be or comprise polyvinyl chloride (PVC).

The second thermoplastic material may be or comprise polyurethane (PU).

The first thermoplastic material may be or comprise polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof.

The second thermoplastic material may be or comprise polyvinyl chloride (PVC), polyester, polypropylene (PP), polyethylene (PE), polystyrene (PS), polyurethane (PU), polyethylene terephthalate (PET), polyacrylate, methacrylate, polycarbonate polyvinyl butyral, polybutylene terephthalate, or a combination thereof.

The building panel may further comprise a decorative layer arranged on the core, wherein the wear resistant foil is arranged on the decorative layer.

The core may comprise a third thermoplastic material.

The core may be a thermoplastic core, a WPC (Wood Plastic Composite), a wood-based board, a mineral board, etc.

The third thermoplastic material may be or comprise polyvinyl chloride (PVC), polyester, polypropylene (PP), polyethylene (PE), polystyrene (PS), polyurethane (PU), polyethylene terephthalate (PET), polyacrylate, methacrylate, polyvinyl butyral, or a combination thereof. The core may be provided with several layers. The core may be foamed.

The core may be a wood-based board or a mineral board. The core may in embodiments be HDF, MDF, particleboard, OSB, Wood Plastic Composite (WPC). Any intermediate layer or layers may be arranged between the core and the decorative layer, or the wear resistant foil.

The wear resistant particles may preferably comprise aluminum oxide. The wear resistant may comprise aluminum oxide such as corundum, carborundum, quartz, silica, glass, glass beads, glass spheres, silicon carbide, diamond particles, hard plastics, reinforced polymers and organics, or combinations thereof.

The wear resistant particles may have an average particle size of less than 45 μm.

The wear resistant particles may have a refractive index similar to the refractive index of the second foil. The wear resistant particles may have a refractive index of 1.4-1.7. In one embodiment, the wear resistant particle may have a refractive index of 1.4-1.9, preferably 1.5-1.8, for example, 1.7-1.8. The refractive index of the wear resistant particles may not differ from the refractive index of the second foil more than ±20%.

A thickness of the second foil may be less than 75 μm, for example, such as about 50 μm, after the building panel has been formed.

BRIEF DESCRIPTION OF THE DRAWINGS

The present disclosure will by way of example be described in more detail with reference to the appended schematic drawings, which show embodiments of the present disclosure.

DETAILED DESCRIPTION

Figure 1:
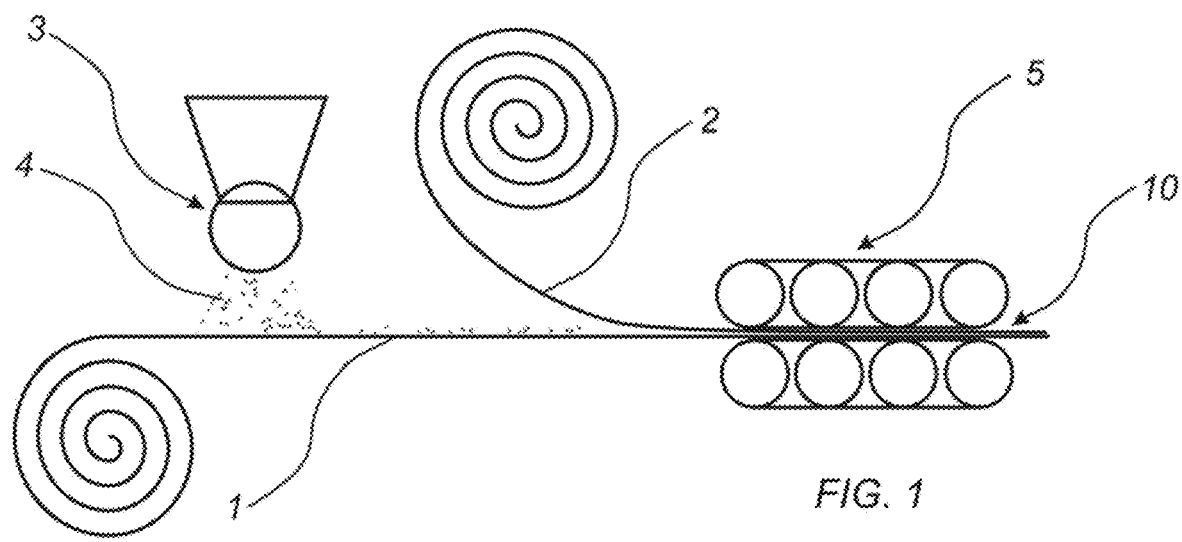
FIG. 1 shows a method to produce a wear resistant foil.

A method to produce a wear resistant foil 10 according to an embodiment will now be described with reference to FIG. 1. FIG. 1 shows a production line for producing a wear resistant foil 10. A first foil 1 is provided, preferably as a continuous web. The first foil 1 may also be cut into sheets. The first foil 1 may also be formed by an extrusion process in connection with forming the wear resistant foil 10.

The first foil 1 comprises a first thermoplastic material. The first thermoplastic material may be polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof.

Preferably, the first foil 1 is formed of the thermoplastic material. The first foil 1 may substantially consist of the thermoplastic material, and optionally additives. Additives may be plasticizers, stabilizers, lubricants, degassing agents, coupling agents, compatibilizers, crosslinking agents, etc.

In one embodiment, the first foil 1 is a PVC foil.

The first foil 1 may have a thickness of 0.1-1 mm.

In one embodiment, the first foil 1 is a decorative foil. The first foil 1 may be printed, for example by digital printing, direct printing, rotogravure, etc. The print is preferably facing away from a second foil when applied on the first foil 1.

As shown in FIG. 1, an applying device 3 applies, preferably scatters, wear resistant particles 4 on the first foil 1. The wear resistant particles 4 may be aluminum oxide particles such as corundum. Alternatively, or as a complement, the wear resistant particles 4 may be carborundum, quartz, silica, glass, glass beads, glass spheres, silicon carbide, diamond particles, hard plastics, reinforced polymers and organics, or a combination thereof.

The wear resistant particles 4 preferably have an average particle size of within the range of 10-200 μm, preferably within the range of 50-120 μm such as within the range of 50-100 μm. The wear resistant particles 4 may have an average particle size of less than 50 μm, preferably less than 45 μm. The wear resistant particles 4 may have a spherical shape or may have an irregular shape. The wear resistant particles 4 may be surface treated. The wear resistant particles 4 may be silane-treated particles.

The wear resistant particles 4 may have a refractive index similar to the refractive index of the second foil 2. The wear resistant particles may have a refractive index of 1.4-1.7. In one embodiment, the wear resistant particle may have a refractive index of 1.4-1.9, preferably 1.5-1.8, for example, 1.7-1.8. The refractive index of the wear resistant particles may not differ from the refractive index of the second foil more than ±20%.

The wear resistant particles may be applied in an amount of 20-100 g/m2, preferably in an amount of 40-60 g/m2.

After the wear resistant particles 4 have been applied on the first foil 1, a second foil 2 is provided and arranged on the first foil 1. The wear resistant particles 4 are thereby encapsulated by the first foil 1 and the second foil 2.

As an alternative or complement to apply the wear resistant particles 4 on the first foil 1, the wear resistant particles 4 may be applied on the second foil 2. In this embodiment, the second foil 2 with the wear resistant particles 4 is arranged on the first foil 1, or vice versa.

The second foil 2 comprises a second thermoplastic material. The second thermoplastic material may be the same as in the first foil 1, or being different from the thermoplastic material of the first foil 1. The second thermoplastic may be polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof.

Preferably, the second foil 2 is formed of the thermoplastic material. The second foil 2 may substantially consist of the thermoplastic material, and optionally additives. Additives may be plasticizers, stabilizers, lubricants, degassing agents, coupling agents, compatibilizers, crosslinking agents, etc.

In one embodiment, the first foil 1 is a PVC foil and the second foil 2 is PU foil.

The second foil 2 may be provided as a foil produced in a separate production step. The second foil 2 may be provided as continuous web.

In other embodiments, the second foil 2 may be formed by an extrusion process such as extrusion coating or extrusion lamination the second foil 2 on the first foil 1, such as described with reference to FIG. 5A.

The second foil 2 may have a thickness of 0.01-1 mm, preferably as measured in the final product, for example, after pressing or extruding. Preferably, the second foil 2 has a thickness less than 0.5 mm, more preferably less than 75 µm, for example, such as about 50 µm, preferably as measured in the final product, for example, after pressing or extruding.

The first foil 1 may have a thickness exceeding the thickness of the second foil 2. Especially if the first foil 1 comprises PVC and the second foil 2 comprises PU, the first foil 1 may have a thickness exceeding the thickness of the second foil 2.

The wear resistant particles 4 may have an average particle size being less than the thickness of the second foil 2. However, the wear resistant particles 4 may have an average particle size being larger than the thickness of the second foil 2. During pressing, the wear resistant particles 4 are pressed into the first foil 1 such that the wear resistant particles 4 do not protrude beyond an upper surface of the second foil 2 after pressing, although the wear resistant particles 4 have an average particle size exceeding the thickness of the second foil 2.

The ratio between the size of the wear resistant particles 4 and the thickness of the second foil 2 may be less than 1.5:1.

Scratch resistant particles (not shown) may also be applied on the second foil 2. As an alternative or complement, scratch resistant particles may also be applied on the first foil 1. By scratch resistant particles are meant particles improving the scratch or scratch resistant properties of the first and/or second foil 1, 2. The scratch resistant particles may be applied together with the wear resistant particles 4, for example as a mix, or may be applied separately. The scratch resistant particles may be may be or comprise nano-sized silica particles, preferably fused silica particles. The scratch resistant particles may be or comprise aluminum oxide.

The scratch resistant particles may be disc shaped particles, preferably having a width/thickness ratio being equal or exceeding 3:1, more preferably being equal or exceeding 5:1. Such disc-shaped particles orientate along the surface of the foil, thereby improving the scratch resistance of the foil. The scratch resistant particles may have an average particle size of 1-50 µm, preferably 10-20 µm.

The first and the second foil 1, 2 are thereafter adhered to each other to form a wear resistant foil 10 comprising the first foil 1, the second foil 2, and wherein at least a part of the wear resistant particles 4 are arranged between the first foil 1 and the second foil 2.

The wear resistant foil 10 is preferably transparent, or at least substantially transparent.

The first and the second foil 1, 2 may be adhered to each other by being pressed together, for example, in a calendering process. As shown in FIG. 1, the first and the second foil 1, 2 are pressed in a continuous press 5. The first and second foil may be adhered together by pressure alone, by heat and pressure, by pressure and adhesive, or by heat, pressure, and adhesive. Preferably, both pressure and heat is applied in order to adhere the first and the second foil to each other. As an alternative or a complement to a calendering process, a continuous or static press may also be used. The pressing operation may, for example, be a hot-hot process, a hot-cold process, etc. The pressing may be made with an embossed press matrix or press roller, such that an embossed structure is formed in the wear resistant foil.

Depending on the thermoplastic materials and process used, the pressure applied may be 5-100 bar, applied for example during 5-500 seconds. The temperature may be 80-300° C., such as 100-250° C., such as 150-200° C., such as 100-130° C.

By the process described above with reference to FIG. 1, a wear resistant foil 10 is formed. The wear resistant foil 10 may be formed as a continuous foil, or be cut into sheets.

As an alternative, the first and second foil 1, 2 may be adhered to each other by an adhesive, such as hot melt.

After adhering, for example, by pressing, the layers to each other, the wear resistant particles 4 are enclosed by the first and the second foil 1, 2. Preferably, the wear resistant particles 4 do not protrude beyond the surface of the second foil 2 facing away from the first foil 1. Thereby, a wear resistant foil 10 having a smooth surface can be formed.

It is contemplated that the wear resistant foil 10 may be adhered to a decorative layer 22 as described below in the same step such that a decorative wear resistant foil is formed.

Figure 2:
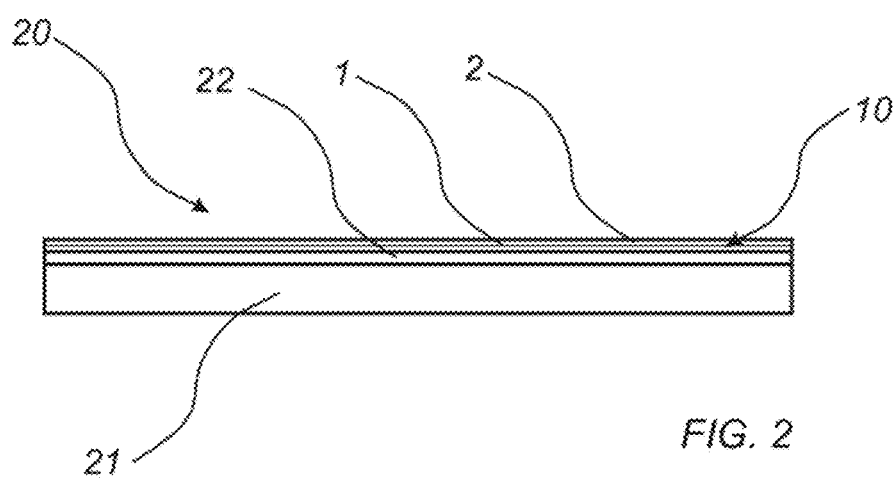
FIG. 2 shows a building panel.

The wear resistant foil 10 may in a subsequent step be adhered to a core 21 to form a building panel 20, as shown in FIG. 2. The building panel 20 may be a floor panel, a wall panel, a ceiling panel, a furniture component, etc.

The core 21 may comprise a third thermoplastic material. The third thermoplastic material may be the same as the first and/or second thermoplastic material, or be different from the first and/or the second material.

The third thermoplastic material may comprise polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof. The core 21 may be formed of several layers. The core 21 may be foamed.

In one embodiment, the core 21 comprises the third thermoplastic material and fillers. The fillers may comprise calcium carbonate, such as chalk and/or limestone.

In one embodiment, the core 21 is a Wood Plastic Composite (WPC), comprising the third thermoplastic material and wood particles as fillers.

The core 21 may be provided with a decorative layer 22 arranged on an upper surface of the core 21 as shown in FIG. 2. The wear resistant foil 10 is then arranged on the decorative layer 22. The decorative layer 22 may be a decorative foil comprising a thermoplastic material. The thermoplastic material of the decorative layer may be or comprise polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof. The decorative foil is preferably printed, for example by direct printing, rotogravure, or digital printing.

The core 21 may also be provided with a balancing layer (not shown) arranged on a lower surface of the core 21, opposite the decorative layer 22. The core 21 may also be provided with intermediate layer or layers (not shown) arranged between an upper surface of the core and the decorative 22 layer or the wear resistant foil 11.

The wear resistant foil 10 produced according to the method described above with reference to FIG. 1, is arranged on the decorative layer 22. The core 21, the decorative layer 22, and the wear resistant foil 10 are pressed together to form a building panel. Heat may also be applied when applying pressure. The core 21, the decorative layer 22 and the wear resistant foil 10 may be pressed together in continuous press, a static press, or in a calendering operation. The pressing may be made with an embossed press matrix or press roller, such that an embossed structure is formed in the wear resistant foil 10.

As an alternative, the wear resistant foil 10 may be adhered to the core 21 by an adhesive, such as hot melt.

A coating (not shown) may be applied on the second foil 2. The coating may comprise acrylate or methacrylate monomer or acrylate or methacrylate oligomer. The coating may be radiation curing, such as UV curing or electron beam curing.

As an alternative to a separate decorative layer 22, a print may be printed directly on the top surface of core 21. The wear resistant foil 10 is thereby arranged directly on the core.

In one embodiment, the first foil 1 is a decorative layer. The first foil 1 may be printed, for example by digital printing, direct printing, rotogravure, etc. The wear resistant foil 10 is in this embodiment arranged directly on the core of the above described type. The wear resistant foil 10 thereby includes a decorative layer. Preferably, the print is facing the core 21.

An embodiment of the building panel 10 comprises a core 21 comprising PVC, a decorative foil 22 comprising PVC, a wear resistant foil 10 comprising PVC in the first foil 1 and PU in the second foil 2.

In other embodiments, the core 21 may be a wood-based board or a mineral board. The core 21 may, for example, be a HDF, MDF, particleboard, plywood, OSB, etc.

As an alternative to the decorative foil, the decorative layer 22 may be formed of a thermoplastic material applied as a powder on the core 21. A print may be printed in the powder thermoplastic material. The thermoplastic material in powder form may be polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof. The wear resistant foil 10 is arranged on the powder layer and pressed together. The core 21 may be of the above described type.

Another alternative to the decorative foil is to apply a thermosetting binder, preferably an amino resin and in powder form, and lignocellulosic or cellulosic particles for forming the decorative layer 22 on the core. A print is may be printed in the powder layer, or pigments may be included. The core 21 may be of the above described type. The wear resistant foil 10 is arranged on the powder layer and pressed together under heat, such that the thermosetting binder of the decorative layer is cured.

Other alternatives for forming the decorative layer are providing a wood veneer layer, a cork layer, or a paper layer for forming the decorative layer.

The different layers, i.e., the core 21, the decorative layer 22, the wear resistant foil 10, may be provided as continuous layers or provided as sheets.

Figure 3:
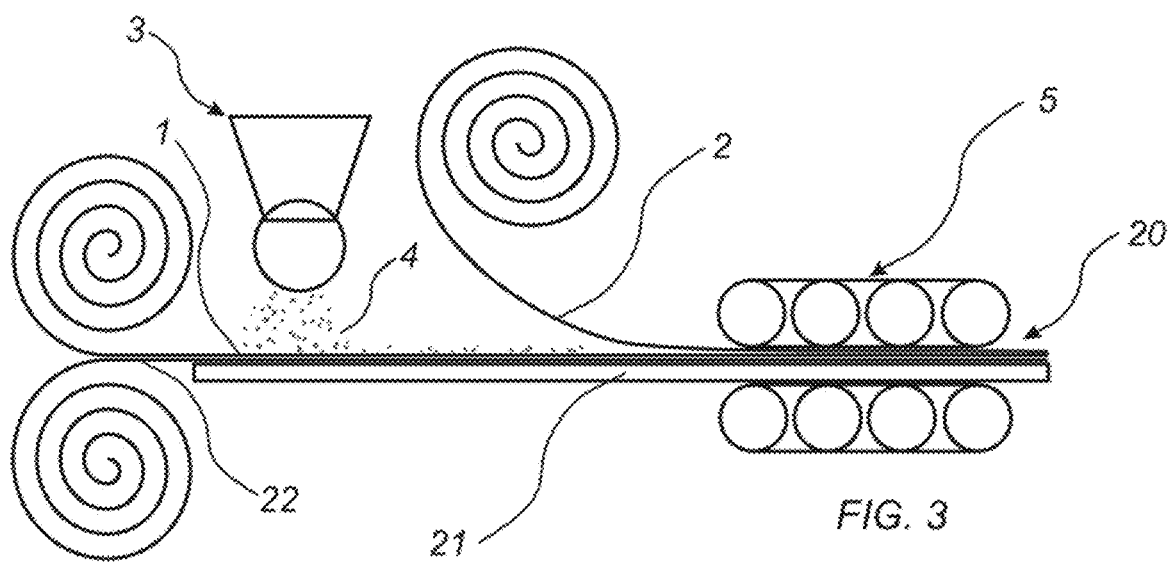
FIG. 3 shows a method to produce a building panel.

FIG. 3 shows a method to produce a building panel 10 including forming a wear resistant foil 10 integrated into the production of the building panel 10. The building panel 10 may be a floor panel, a wall panel, a ceiling panel, a furniture component, etc.

A core 21 is provided. The core 21 may comprise a third thermoplastic material. The third thermoplastic material may be the same as the first and/or second material, or be different from the first and/or the second material.

The third thermoplastic material may comprise polyvinyl chloride (PVC), polyester, polypropylene (PP), polyethylene (PE), polystyrene (PS), polyurethane (PU), polyethylene terephthalate (PET), polycarbonate, polyacrylate, methacrylate, polyvinyl butyral, polybutylene terephthalate, or a combination thereof. The core 21 may be formed of several layers. The core 21 may be foamed. The core 21 may be provided as a board or as a continuous material.

In one embodiment, the core 21 comprises the third thermoplastic material and fillers. The fillers may comprise calcium carbonate, such as chalk and/or limestone, or sand.

In one embodiment, the core 21 is a Wood Plastic Composite (WPC), comprising the third thermoplastic material and wood particles as fillers.

The core 21 may be provided with a decorative layer 22 arranged on an upper surface of the core 21. The wear resistant foil 10 is then arranged on the decorative layer 22. The decorative layer 22 may be a decorative foil comprising a thermoplastic material. The thermoplastic material of the decorative layer may be or comprise polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof. The decorative foil is preferably printed, for example by direct printing, rotogravure, or digital printing. The decorative layer may be a wood veneer layer, a cork layer, a paper layer. The decorative layer 22 may be provided as a continuous web or as sheets.

The core 21 may also be provided with a balancing layer (not shown) arranged on a lower surface of the core 21, opposite the decorative layer 22.

A first foil 1 is arranged on the core 21, or on the decorative layer 22. The first foil 1 comprises a first thermoplastic material. The first thermoplastic material may be polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof.

Preferably, the first foil 1 is formed of the thermoplastic material. The first foil 1 may substantially consist of the thermoplastic material, and optionally additives. Additives may be plasticizers, stabilizers, lubricants, degassing agents, coupling agents, compatibilizers, crosslinking agents, etc.

In one embodiment, the first foil 1 is a PVC foil.

The first foil 1 may have a thickness of 0.1-1 mm preferably as measured in the final product, for example, after pressing or extruding.

The first foil 1 may be provided as a continuous web. The first foil 1 may also be cut into sheets. The first foil 1 may also be formed by an extrusion process, preferably in connection with forming the building panel.

As shown in FIG. 3, an applying device 3 applies, preferably scatters, wear resistant particles 4 on the first foil 1. The wear resistant particles 4 may be aluminum oxide particles, such as corundum. Alternatively, or as a complement, the wear resistant particles 4 may be carborundum, quartz, silica, glass, glass beads, glass spheres, silicon carbide, diamond particles, hard plastics, reinforced polymers and organics, or a combination thereof. The wear resistant particles 4 may be surface treated. The wear resistant particles 4 may be silane-treated particles.

The wear resistant particles 4 preferably have an average particle size within the range of 10-200 μm, preferably within the range of 50-120 μm, such as 50-100 μm. The wear resistant particles 4 may have an average particle size of less than 50 μm, preferably less than 45 μm. The wear resistant particles 4 may have a spherical shape or an irregular shape.

The wear resistant particles 4 may have a refractive index similar to the refractive index of the second foil 2. The wear resistant particles may have a refractive index of 1.4-1.7. In one embodiment, the wear resistant particle may have a refractive index of 1.4-1.9, preferably 1.5-1.8, for example, 1.7-1.8. The refractive index of the wear resistant particles may not differ from the refractive index of the second foil more than ±20%.

The wear resistant particles may be applied in an amount of 20-100 g/m2, preferably in an amount of 40-60 g/m2.

The wear resistant particles 4 may have an average particle size being less than the thickness of the second foil 2. However, the wear resistant particles 4 may have an average particle size being larger than the thickness of the second foil 2. During pressing, the wear resistant particles 4 are pressed into the first foil such that the wear resistant particles do not protrude beyond an upper surface of the second foil 2 after pressing, although the wear resistant particles 4 having an average particle size exceeding the thickness of the second foil.

The ratio between the size of the wear resistant particles 4 and the thickness of the second foil 2 may be less than 1.5:1.

After the wear resistant particles 4 have been applied on the first foil 1, a second foil 2 is provided and arranged on the first foil 1. The wear resistant particles 4 are thereby encapsulated between the first foil 1 and the second foil 2.

As an alternative or complement to apply the wear resistant particles 4 on the first foil 1, the wear resistant particles 4 may be applied on the second foil 2. In this embodiment, the second foil 2 with the wear resistant particles 4 is arranged on the first foil 1, or vice versa.

The second foil 2 comprises a second thermoplastic material. The second thermoplastic material may be the same as in the first foil 1, or being different from the thermoplastic material of the first foil 1. The second thermoplastic may be polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof.

The second foil 2 may be provided as a foil produced in a separate production step. The second foil 2 may be provided as continuous web as shown in FIG. 3.

In other embodiments, the second foil 2 may be formed by an extrusion process such as extrusion coating or extrusion lamination the second foil 2 on the first foil 1 as described with reference to FIG. 5B.

The second foil 2 may have a thickness of 0.01-1 mm, preferably as measured in the final product, for example, after pressing or extruding. Preferably, the second foil 2 has a thickness less than 0.5 mm, more preferably less than 75 μm, for example, such as about 50 μm, preferably as measured in the final product, for example, after pressing or extruding.

Preferably, the second foil 2 is formed of the thermoplastic material. The second foil 2 may substantially consist of the thermoplastic material, and optionally additives. Additives may be plasticizers, stabilizers, lubricants, degassing agents, coupling agents, compatibilizers, crosslinking agents, etc.

In one embodiment, the first foil 1 is a PVC foil and the second foil 2 is PU foil.

Scratch resistant particles (not shown) may be applied on the second foil 2. As an alternative or complement, scratch particles may also be applied on the first foil 1 prior to applying the second foil 2. By scratch resistant particles are meant particles improving the scratch or scratch resistant properties of the first and/or second foil. The scratch resistant particles may be applied together with the wear resistant particles 4, for example as a mix, or may be applied separately. The scratch resistant particles may be may be or comprise nano-sized silica particles, preferably fused silica particles. The scratch resistant particles may be or comprise aluminum oxide.

The scratch resistant particles may be disc shaped particles, preferably having a width/thickness ratio being equal or exceeding 3:1, more preferably being equal or exceeding 5:1. Such disc-shaped particles orientate along the surface of the foil, thereby improving the scratch resistance of the foil. The scratch resistant particles may have an average particle size of 1-50 μm, preferably 10-20 μm.

The different layers, i.e. the core 21, the decorative layer 22, the wear resistant foil 10, may be provided as continuous layers or being cut into sheets.

The core 21, the first foil 1 and the second foil 2 are thereafter adhered to each other to form a building panel 20 comprising the core 21, the first foil 1, the second foil 2, and wherein a least a portion of the wear resistant particles 4 are arranged between the first foil 1 and the second foil 2. The first foil 1, the second foil 2 and the wear resistant particles 4 arranged therebetween form a wear resistant foil 10 of the building panel 20.

The wear resistant foil 10 is preferably transparent, or at least substantially transparent, for example, having a light transmittance index exceeding 80%, preferably exceeding 90%.

The core 21, the first and the second foil 1, 2 may be adhered to each other by being pressed together in a pressing station 5. The press may be a continuous or static press. The core 21, the first and the second foil 1, 2 may be calendered together. Preferably, both pressure and heat is applied in order to adhere the first and the second foil to each other. The pressing operation may for example be made as a hot-hot process, a hot-cold process, etc. The pressing may be made with an embossed press matrix or press roller, such that an embossed structure is formed in the wear resistant foil 10.

Depending on the thermoplastic materials and process used, the pressure applied may be 5-100 bar, applied for example during 5-500 seconds. The temperature may be 80-300° C., such as 100-250° C., such as 150-200° C.

As an alternative, the layers may be adhered to each other by an adhesive, such as hot melt.

After adhering, for example, by pressing, the layers to each other, the wear resistant particles are enclosed by the first foil, or by the first and the second foil. Preferably, the wear resistant particles do not protrude beyond the surface of the second foil facing away from the first foil. Thereby, a wear resistant foil 10 having a smooth surface can be formed.

A coating (not shown) may be applied on the second foil 2. The coating may comprise acrylate or methacrylate monomer or acrylate or methacrylate oligomer. The coating may be radiation curing, such as UV curing or electron beam curing.

As an alternative to a separate decorative layer 22, a print may be printed directly on the upper surface of core 21. The wear resistant foil 10 is thereby arranged directly on the core.

As an alternative to a separate decorative layer 22, the first foil 1 of the wear resistant foil 10 may be a decorative foil. The first foil 1 may be printed, for example by digital printing, direct printing, rotogravure, etc. The wear resistant foil 10 is thereby arranged directly on the core 21. Preferably, the print faces the core 21.

As an alternative to the decorative foil described above, the decorative layer 22 may be formed of a thermoplastic material applied as a powder on the core. A print may be printed in the powder thermoplastic material. The thermoplastic material in powder form may be polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or combination thereof. The first foil 1 of the wear resistant foil 10 is arranged on the powder layer and pressed together as described above. The core 21 may be of the above described type.

Another alternative to the decorative foil described above is to apply a thermosetting binder, preferably an amino resin and in powder form, and lignocellulosic or cellulosic particles for forming the decorative layer 22 on the core 21. A print is may be printed in the powder layer, or pigments may be included. The core 21 may be of the above described type. The first foil 1 of the wear resistant foil 10 is arranged on the powder layer and the powder layer and the first foil 1 are pressed together under heat as described above, such that the thermosetting binder of the decorative layer is cured.

Other alternatives for forming the decorative layer 22 are providing a wood veneer layer, a cork layer or a paper layer for forming the decorative layer.

It is also contemplated that the first foil 1 may be excluded. The wear resistant particles 4 of the above described type may be applied directly on the core 21 of the above described type. The second foil 2 of the above described type may be arranged on an upper surface of the core 21 and on the wear resistant particles 4. The upper surface of the core 21 may be provided with a print. Alternatively, a decorative layer 22 of the above type may be arranged on the core 21. The core 21, the wear resistant particles 4, and the second foil 2 are then pressed together to form a building panel 20 in the above described way.

It is contemplated that the core 21 may be excluded in the embodiments described with reference to FIG. 3. By pressing together the decorative layer 22 and the wear resistant foil 10, a decorative substrate having wear resistant properties is provided.

In addition to the building panel 20 described above with reference to FIG. 2, building panels 20 having another structure may also be provided by the methods described above.

Figure 4A:
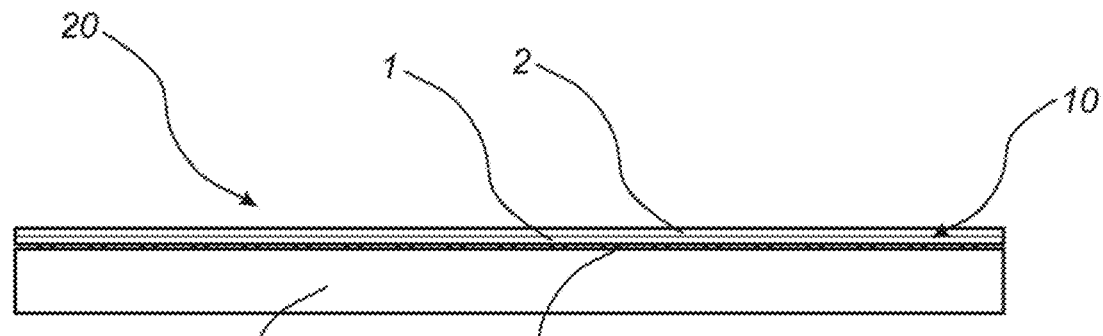
FIG. 4A-C show embodiments of a building panel.

According to one embodiment, which is shown in FIG. 4A, building panel 10 comprising a core 21 of the above described type and a wear resistant foil 10 manufactured according to the embodiment described with reference to FIG. 1. Alternatively, the building panel 10 is manufactured according to the embodiment described with reference to FIG. 3 wherein the decorative layer 22 is excluded. An upper surface of the core 21 may be provided with a print 23, for example printed by for example by digital printing, direct printing or rotogravure. The wear resistant foil 10 is arranged directly on the core 21.

Figure 4B:
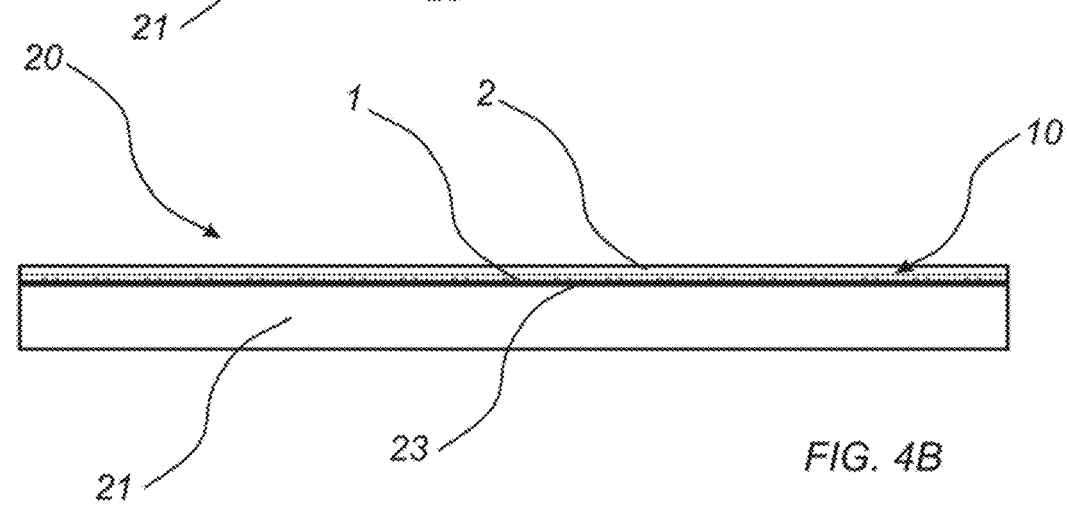

According to one embodiment, which is shown in FIG. 4B, a building panel 10 comprising a core 21 of the above described type and a wear resistant foil 10 manufactured according to the embodiment described with reference to FIG. 1. Alternatively, the building panel 10 is manufactured according to the embodiment described with reference to FIG. 3, wherein the decorative layer 22 is excluded. The first foil 1 of the wear resistant foil 10 may be a decorative foil. The first foil 1 may be provided with a print 23, for example printed by digital printing, direct printing or rotogravure. The wear resistant foil 10 is arranged directly on the core 21.

Figure 4C:
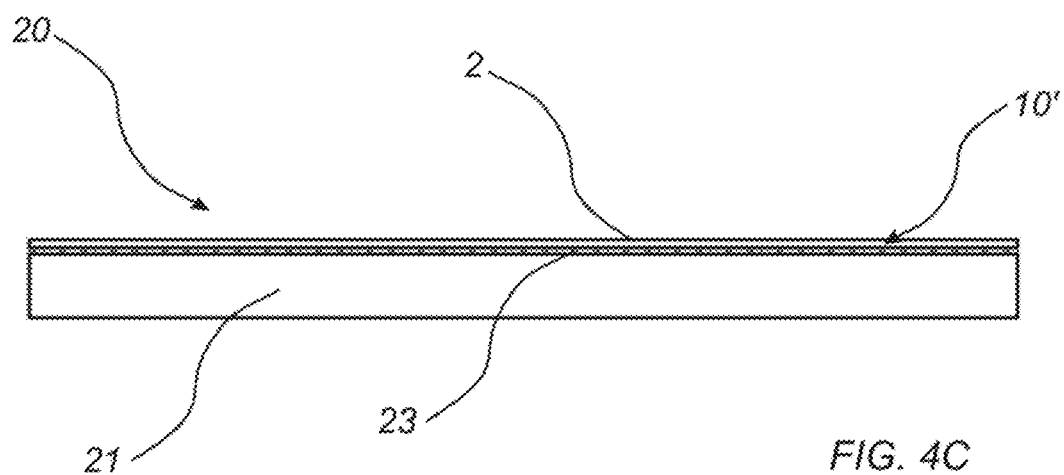

It is contemplated that in one embodiment, the first foil 1 may be excluded in the embodiment described above with reference to FIG. 3. According to this embodiment, which is shown in FIG. 4C, the wear resistant particles 4 are applied directly on a core 21 of the above described type. An upper surface of the core 21 may be provided with a print 23, for example printed by digital printing, direct printing or rotogravure. Alternatively, the core 21 may be provided with a decorative layer 22 of the above described type, for example, a printed thermoplastic foil, a wood veneer layer, a cork layer, a paper layer, etc. A second foil 2 of the above described type is applied directly on the wear resistant particles 4 of the above described type and the upper surface of the core 21. A building panel 20 including a wear resistant foil 10' formed by the wear resistant particles 4 and the second foil 2 is thereby formed.

Figure 5A:
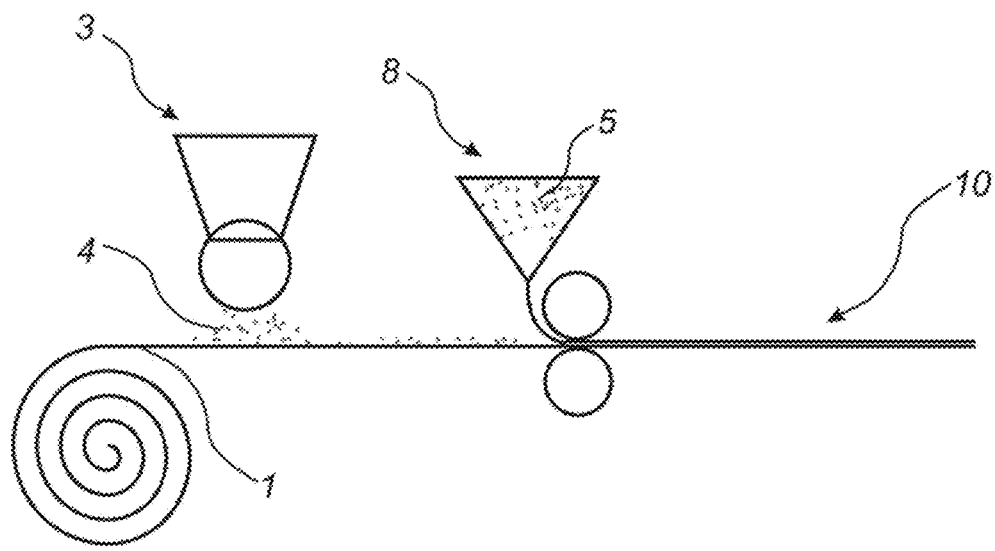
FIG. 5A shows a method to produce a wear resistant foil.
Figure 5B:
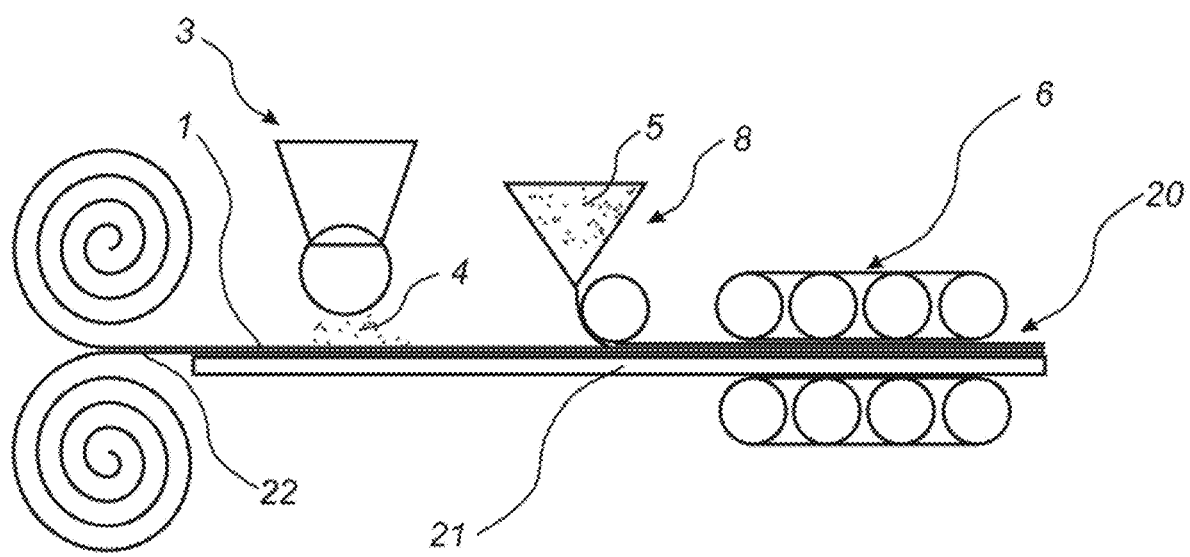
FIG. 5B shows a method to produce a building panel.

In all embodiments, the second thermoplastic material of the above type may be applied in an extrusion process, which is shown in FIGS. 5A-B. In FIG. 5A, a first foil 1 is provided. The first foil 1 is of the type described above with reference to FIGS. 1, 2, 3, 4A-B. In the embodiment shown FIG. 5A, the wear resistant particles 4 of the above described type are applied on the first foil 1 by the applying device 3. The second thermoplastic material 5 is preferably provided as granulates. The second thermoplastic material 5 is applied on the first foil 1 in molten form by an extruder 8. For example, the second thermoplastic material 5 is applied on the first foil 1 by an extrusion process such as extrusion lamination or extrusion coating. The second thermoplastic material 5 is applied after the wear resistant particles 4 have been applied. Thereby, a wear resistant foil 10 has been produced.

The method to produce a wear resistant foil 10 by using an extrusion technique as described above with reference to FIG. 5A is also applicable when forming a building panel corresponding to the embodiment shown in FIG. 4A-B, which is shown in FIG. 5B.

In FIG. 5B, a first foil 1 and a core 21 are provided. The first foil 1 and the core 21 are of the type described above with reference to FIGS. 3 and 4A-B. In the embodiment shown FIG. 5B, the wear resistant particles 4 of the above described type are applied on the first foil 1 by an applying device 3. The second thermoplastic material 5 is preferably provided as granulates. The second thermoplastic material 5 is applied on the first foil 1 in molten form by an extruder 8. For example, the second thermoplastic material 5 is applied on the first foil 1 by an extrusion process such as extrusion lamination or extrusion coating. The second thermoplastic material 5 is applied after the wear resistant particles 4 have been applied.

The core 21, the first foil 1 provided with the wear resistant particles 4 and the second thermoplastic material 5 are adhered together for forming a building panel 20, for example, by pressing, such as calendaring, for example, by calendering rolls 6, as shown in FIG. 5B. Alternatively, the layers may be adhered to each other by means of an adhesive such as hot melt.

It is also contemplated that the co-extruding may be used to form the wear resistant foil. The first foil comprising the first thermoplastic material and a second foil comprising the second thermoplastic material may be formed by co-extruding the first and the second foil. The wear resistant particles may be mixed with the second thermoplastic material, or applied separately on the first and/or the second foil.

Any of the above described building panels 10 may be provided with a mechanical locking system. The mechanical locking system may be of the type described in WO 2007/015669, WO 2008/004960, WO 2009/116926, or WO 2010/087752, the entire contents of each is expressly incorporated by reference herein.

In the embodiments above, the wear resistant foil 10 is described as including the first foil 1 and the second foil 2. However, after pressing, the boundaries between the first and the second foil 1, 2 may be less distinct, such that in some embodiments it may be difficult to distinguish the first foil 1 from the second foil 2. At least a part of the wear resistant particles are 4 located intermediate the first and the second foil 1, 2. A part of the wear resistant particles 4 may be located within the second foil 2.

It is contemplated that the first foil 1 may be formed of a powder layer, for example, comprising the first thermoplastic material of the above described type and optionally filler such as wood particles, calcium carbonate, sand, etc.

It is contemplated that there are numerous modifications of the embodiments described herein, which are still within the scope of the disclosure. For example, it is contemplated that more than one wear resistant foil may be arranged on a core for forming a building panel.

EXAMPLES

Example 1: Comparative Example

A PVC wear layer foil with a thickness of 0.3 mm was positioned on a decorative foil with a thickness of 0.1 mm. The two foils were laminated on to a PVC core material using a temperature of 160° C., a pressure of 20 bar and a pressing time of 40 seconds. The resulting product was a LVT product. The LVT product was found to have a wear resistance of 3200 revolutions as tested in a Taber abrader.

Example 2: PVC Foil on PVC Foil

A PVC wear layer foil with a thickness of 0.3 mm was positioned on a decorative foil with a thickness of 0.1 mm. On to the wear layer foil 10 g/m2 Al2O3 was scattered using a scattering device. A second PVC wear layer foil with a thickness of 0.3 mm was positioned on the scattered Al2O3. The three foils were laminated on to a PVC core material using a temperature of 160° C., a pressure of 20 bar and a pressing time of 40 seconds. The resulting product was a LVT product. The LVT product was found to have a wear resistance higher than 8000 revolutions as tested in a Taber abrader.

Example 3: PU Foil on PVC Foil

A PVC wear layer foil with a thickness of 0.3 mm was positioned on a decorative foil with a thickness of 0.1 mm. On to the wear layer foil 10 g/m2 Al2O3 was scattered using a scattering device. A PU foil with a thickness of 0.05 mm was positioned on the scattered Al2O3. The three foils were laminated on to a PVC core material using a temperature of 140° C., a pressure of 20 bar and a pressing time of 40 seconds. The resulting product was a LVT product. The LVT product was found to have a wear resistance higher than 8000 revolutions as tested in a Taber abrader.

Example 4: PU Foil on PVC Foil

A printed decorative PVC foil having a thickness of 0.08 mm was arranged on a core comprising three layers and having a thickness of 4 mm. A PVC wear layer having a thickness of 0.25 mm was arranged on the decorative PVC foil. Wear resistant particles in form of aluminum oxide were applied in an amount of 40 g/m2 on the PVC wear layer. A PU foil having a thickness of 0.05 mm was arranged on the wear resistant particles and the PVC wear layer. The different layers were pressed together in a cold-hot-cold process. The pressure applied was 10 bar. The temperatures applied in the cold-hot-cold process were 50° C., 140° C., and 50° C. The product was pressed at 140° C. during 4 minutes. The total pressing time was approximately 55 minutes. The resulting product was a LVT product. The LVT product was found to have a wear resistance higher than 8000 revolutions as tested in a Taber abrader.

The invention claimed is:

1. A wear resistant foil comprising:
a first foil comprising a first thermoplastic material;
a second foil comprising a second thermoplastic material; and
wear resistant particles,
wherein all of the wear resistant particles are arranged between the first and second foils, wherein all of the wear resistant particles are enclosed by the first and the second foil,
wherein the wear resistant foil does not have any wear resistant particles which are not: (i) between the first and second foils and (ii) enclosed by the first and second foils.

2. The wear resistant foil according to claim 1, wherein the first thermoplastic material comprises polyvinyl chloride (PVC).

3. The wear resistant foil according to claim 1, wherein the second thermoplastic material comprises polyurethane (PU).

4. The wear resistant foil according to claim 1, wherein the wear resistant particles comprise aluminium oxide.

5. The wear resistant foil according to claim 1, wherein the wear resistant particles have an average particle size of less than 45 µm.

6. The wear resistant foil according to claim 1, wherein the wear resistant particles do not protrude from a surface of the second foil opposite the first foil.

7. The wear resistant foil according to claim 1, wherein the wear resistant foil is substantially transparent.

8. The wear resistant foil according to claim 1, wherein the wear resistant foil is formed by pressing the first foil and the second foil together, wherein a thickness of the second foil is less than 75 µm after pressing.

9. A building panel comprising:
a core; and
a wear resistant foil arranged on the core,
wherein the wear resistant foil comprises:
a first foil comprising a first thermoplastic material;
a second foil comprising a second thermoplastic material; and
wear resistant particles, and
wherein all of the wear resistant particles are arranged between the first and the second foil, wherein all of the wear resistant particles are enclosed by the first and the second foil,
wherein the wear resistant foil does not have any wear resistant particles which are not: (i) between the first and second foils and (ii) enclosed by the first and second foils.

10. The building panel according to claim 9, wherein the first thermoplastic material comprises polyvinyl chloride (PVC).

11. The building panel according to claim 9, wherein the second thermoplastic material comprises polyurethane (PU).

12. The building panel according to claim 9, wherein the wear resistant particles comprise aluminium oxide.

13. The building panel according to claim 9, wherein the wear resistant particles have an average particle size of less than 45 µm.

14. The building panel according to claim 9, wherein the core comprises polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof.

15. The building panel according to claim 9, further comprising a decorative layer arranged on the core, wherein the wear resistant foil is arranged on the decorative layer.

16. The building panel according to claim 9, wherein the wear resistant foil is formed by pressing the first foil and the second foil together, wherein a thickness of the second foil is less than 75 µm after pressing.

* * * * *